United States Patent [19]

Biffar

[11] Patent Number: 6,066,260
[45] Date of Patent: May 23, 2000

[54] MEANS OF AND PROCESS FOR REGULATING THE HARDNESS AND PH VALUE OF WATER IN FRESHWATER AQUARIA

[75] Inventor: Markus Biffar, Frankfurt am Main, Germany

[73] Assignee: Amtra Aquaristik GmbH, Rodgau, Germany

[21] Appl. No.: 08/766,942

[22] PCT Filed: Apr. 18, 1996

[86] PCT No.: PCT/DE96/00685

§ 371 Date: Dec. 16, 1996

§ 102(e) Date: Dec. 16, 1996

[87] PCT Pub. No.: WO96/33137

PCT Pub. Date: Oct. 24, 1996

[30] Foreign Application Priority Data

Apr. 21, 1995 [DE] Germany .................. 195 14 272

[51] Int. Cl.$^7$ .................. C02F 5/02; C02F 5/14
[52] U.S. Cl. .................. 210/699; 210/700; 210/749
[58] Field of Search .................. 210/699, 700, 210/749; 252/180; 510/247, 253

[56] References Cited

U.S. PATENT DOCUMENTS

| | | | |
|---|---|---|---|
| 3,928,510 | 12/1975 | Hoger et al. | 260/962 |
| 3,954,761 | 5/1976 | Redmore | 210/700 |
| 4,446,046 | 5/1984 | Becker | 252/180 |
| 4,740,280 | 4/1988 | Ruhstorfer | 204/129.95 |
| 4,798,675 | 1/1989 | Lipinski et al. | 210/699 |
| 5,160,630 | 11/1992 | Clubley et al. | 210/699 |
| 5,413,819 | 5/1995 | Drs | 427/427 |
| 5,529,751 | 6/1996 | Gargas | 210/169 |

*Primary Examiner*—David A. Simmons
*Assistant Examiner*—Betsey J. Morrison
*Attorney, Agent, or Firm*—Michael J. Striker

[57] ABSTRACT

In the present state of art, use is made of aqueous mixtures of sodium phosphates, preferably mixtures of pentasodium triphosphate (for softening) and sodium dihydrogen phosphate (to reduce the pH) of hard and slightly alkaline water in aquaria to values acceptable especially for ornamental tropical fish. This inherently effective preparation for softening and acidifying the aquarium water leads, however, to the clouding of the water after a short time and to chalk flocculation, while the hydrolysis of the triphosphate results in an increased level of orthophosphate which is particularly favorable to the growth of algae. The invention prevents these drawbacks by the use of phosphonic acid compounds which complex the alkaline earth metal ions determining the hardness of water. Preferred phosphonic acids here are ethylene diamine tetra(methylene phosphonic acid) and its pentasodium salt and diethylene triamine penta(methylene phosphonic acid) and its heptasodium salt. The complexing phosphonic acids may be used alone or in a mixture.

12 Claims, No Drawings

MEANS OF AND PROCESS FOR REGULATING THE HARDNESS AND PH VALUE OF WATER IN FRESHWATER AQUARIA

TECHNICAL FIELD

The invention concerns means of and a process for regulating the hardness and the pH value of the water in freshwater aquaria based on derivatives of oxo acids of phosphor which are capable of complexing the alkaline earth metal ions determining the water hardness in the water.

To keep fish healthy in aquaria for long periods of time, the aquarium water conditions have to meet those of the water of their natural environment as closely as possible. This applies especially to tropical ornamental fish coming directly or originally from regions with very soft and only slightly acidic water. In contrast to this, in large parts of Central Europe, North America and East Asia—i.e. in those areas with the greatest interest in keeping ornamental fish— the water is generally hard and slightly alkaline. If fish coming from soft water biotopes are kept for long periods in hard water this can lead to massive health problems, especially nephrocalcinosis and acute kidney failure; there are also increased difficulties in acclimatization and furthermore fertility disturbances.

Consequently, water being hard and slightly alkaline has to be softened and adjusted to a slightly acidic pH value.

PRIOR ART

Until recently the softening of aquarium water was attained exclusively by means of relatively expensive technical equipment and processes such as reverse osmosis and ion exchange, at which $CO_2$ devices or mineral acids were used to lower the pH value.

The publication of Hans-J. Krause "Handbuch Aquarienwasser" (2nd ed. (1987), bede-Verlag, pages 34–38 and 79) gives a survey of a limited number of methods for adjusting the water hardness and the pH value of aquarium water at which the focal point of the techniques for adjusting the total hardness was set on the application of calcium sulfate or calcium chloride to increase water hardness and on fully desalinated water to lower the hardness (produced, for example, by reverse osmosis or the use of ion exchangers). The pH value reduction is attained by filtration of the aquarium water through a peat bed (peat filtering) or by increasing the $CO_2$ concentration; the addition of mineral acids to the aquarium water, especially in the form of hydrochloric acid, phosphoric acid or in the form of "minus pH preparations" (such as $NaH_2PO_4$, $KHSO_4$, potassium hydrogen phthalate) is called a widespread but misguided practice in aquaria.

With respect to the use of potassium biphthalate combined with polyvinylpyrrolidone and ethylenediaminetetra acetic acid (EDTA), attention is drawn to DE 22 21 545 C3 which refers to a process for the preparation of aquarium water.

The substantiation for the statement as to why potassium or sodium hydrogen phosphate should be avoided where possible (given in the manual "Handbuch Aquarienwasser" cited above) may be learned from the essay entitled "pH Wert senken, aber wie?" ("Lowering the pH value, but how?") by Hans-J. Krause in DISKUS BRIEF, ann. 10 (1995) pages 9–13, wherein it is stated that phosphate buffers can have undesirable biological effects and consequently peat filtering is still recommended as preferred method for lowering the pH value. In said essay there further is discussed the use of liquid preparations based on aluminium salts for lowering both, the pH value and the total hardness, of the aquarium water leading to the result that, owing to the toxic effect of the aluminium salts on the fish, liquid preparations containing aluminium salts should also not be used.

Details on the toxicity of aluminium salts are given in the essay entitled "Zur Bedeutung der Aluminium-Toxizität für die Aquaristik (On the significance of aluminium toxicity for aquaria" by Horst W. Köhler in DISKUS BRIEF, ann. 10, (1995), pages 4–8.

Apart from any negative biological consequences at the use of mineral acids, the acidification with $CO_2$ or with mineral acid also shows the drawback of an only low and easy to be interfered stability of the reduction of the pH value. If the $CO_2$ acidification is carried out in presence of a high carbonate hardness in the water, the pH value rises to its original level within just a few hours after introduction, whereas at acidification with $CO_2$ or mineral acid in the presence of little or non-existent carbonate remainder in the water, this can lead to a so-called acidity drop being dangerous for the fish.

To obviate the drawbacks of the expensive technology and the instability of the pH value, recently an aqueous preparation based on a mixture of sodium phosphates to simultaneously regulate the hardness and the pH value of the aquarium water has been used, at which the preparation contains pentasodiumtriphosphate(also known as sodiumtripolyphosphate) for softening the water, and sodium dihydrogenphosphate (also known as monosodiumphosphate) to regulate the pH value. The solution typically contains 150 g/l of sodiumtripolyphosphate and 220 g/l of monosodiumphosphate and has a pH value of 5.6 to 5.8. The aquarium dosage depends on the hardness of the water, given in mmol/l alkaline earth metal ions or in ° d (German hardness degree), 1 mmol/l of alkaline earth metal ions corresponding to 5.6° d.

About 1 ml of said conventional solution is used per liter of aquarium water at a water hardness of 1.8 mmol/l (10° d) and up to 3 ml of solution at a water hardness of 4.5 mmol/l (25° d) and at intermediate values of water hardness the corresponding intermediate amounts of solution are used, resulting in concentrations of 150–450 mg/l of sodiumpolyphosphate and 220–660 mg/l of monosodiumtriphosphate in the aquarium water.

If the said solution is used with tap water with a water hardness of 1.8 mmol/l (10° d) and a pH value of 7.5 to a concentration of 1 ml/l, this results in a water hardness of 0.72 mmol/l (4° d) and a pH value of 6.3.

Although the mixture of the water hardness reducing agent sodiumpolyphosphate and the acidification agent monosodiumphosphate make satisfactory results in the meaning of producing a stable and low water hardness and a fixed and stable pH value achievable, in certain common water conditions highly undesirable side effects can arise making the mixture, at best, of little use and at worst, useless for aquaristic purposes.

Therefore in cases where there is a high initial water hardness and a close correlation of carbonate to sulfate hardness, this in the course of time will lead to heavy clouding of the water due to flocculation. Whereas flake formation may be desirable in the process water and in the cooling water technology due to the flake formation preventing crystalline boiler scaling, the flocculation is noxious in an aquarium. The flakes accumulate on the gill tissue of the fish and can cause acute breathlessness and resulting biological damage up to and including death of the affected fish. It is possible initially to combat this clouding and flocculation by adding larger quantities of the said solution, but this is then followed by particularly marked precipitation despite the high concentration of chelating agents. If this process is repeated a number of times, for example after topping up with tap water or after a partial water exchange, the flakes eventually lead to massive deposits of lime scale on the glass panels of the aquarium and on all the fittings including plants, ornaments, water filter and heating elements. The main drawbacks are that the heating elements can be destroyed after overheating due to insufficient heat exchange and the filter material becomes clogged with lime scale leading to the destruction of the bacterial fauna which is an essential element in aquaristic matters, causing a breakdown of the nitrogen cycle.

On the other hand the water hardness reducing agent sodiumpolyphosphate is not stable to hydrolysis and produces orthophosphate, in addition to which the acidifying agent monosodiumphosphate(sodiumorthophosphate) could possibly lead to concentrations of orthophosphate of over 30 ppm in aquaria after so little as five days. In combination with nitrates, which are unavoidable in aquaria, orthophosphate is an essential alga nutrient so that at the relative high concentrations of orthophosphate alongside the continual use of the solution this leads to undesirably high incidence of algal growth.

DESCRIPTION OF THE INVENTION

The object of the invention is to provide an agent, preferably in the form of a ready-to-use solution, especially an aqueous solution, to regulate the hardness and pH value of aquarium water, which should retain, secure or surpass the advantages offered by the conventional solution as described above but avoid the disadvantages. It should also secure water softening without cloudiness, flocculation or increased algal growth while maintaining the regulated water hardness and pH value permanently constant.

Among a number of complexing phosphonic acids being known from the technical industry, used for example in water technology and use, e.g. for the purposes of boiler cleaning and boiler scale removal, of boiler water and cooling water treatment and for desalination plants. Favoured amongst these are 1-hydroxyethane-1,1-diphosphonic acid, $H_3C\text{—}C(OH)[P(O)(OH)_2]_2$, Aminotris(methylenephosphonic acid), $N[CH_2\text{—}P(O)(OH)_2]_3$ and 2-phosphonobutane-1,2,4-tricarbonic acid,

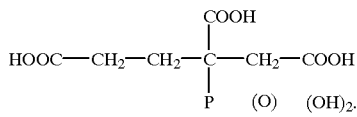

These compounds as well and other compounds as in particular morpholinomethane diphosphonic acid,

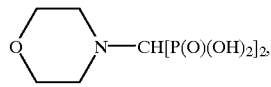

ethylene diaminetetra(methylene phosphonic acid), $[(OH)_2(O)P\text{—}CH_2\text{—}]_2N\text{—}CH_2\text{—}CH_2\text{—}N[\text{—}CH_2\text{—}P(O)(OH)_2]_2$, and diethylenetriaminepenta (methylenephosphonic acid)

Based on the conventional phosphate containing solution described above, or its description in line with the generic part of protection claims 1 and 13, the target is met in terms of the distinguishing features of claim 1 and 13 respectively, although special variations and further developments of the invention are given in the dependent claims 2 to 12 and 14 to 24 respectively.

The invention is based on the contemplation to use compounds which readily complex with calcium ions and magnesium ions for water softening. For this purpose ethylenediaminetetra acetic acid (EDTA—also known as ethylenedinitrilotetra acetic acid) and nitrilotriacetic acid (NTA) were considered. It emerged, however, that EDTA and NTA are not suitable for aquaristic purposes because their acetic acid residues (—$CO_2COOH$) gave rise to rapid bacterial water clouding within a few days leading to rapid oxygen consumption, and because EDTA and NTA have a high affinity also towards heavy metals.

In a next testing step, known complexing sulphonic acids and complexing compounds of phosphonic acids, $H\text{—}P(O)(OH)_2$ were cursorily tested, however the tests with sulphonic acids were not satisfactory because of their low bonding capacity with calcium ions and magnesium ions.

Consequently the subsequent tests were concentrated on the complexing phosphonic acids, especially on the class of methylphosphonic acid $H_3C\text{—}P(O)(OH)_2$ derivatives.

All experiments with phosphonic acids met the main criterion of being harmless to fish and invertebrates, but partially gave rise to water clouding in long term experiments.

proved in terms of the invention's aims in some cases highly successful, in some cases less so.

Attention should also be drawn to DE 41 22 490 A1, according to which a liquid confectioned water softener is proposed for the purpose of washing and cleaning processes, especially for the purpose of textile washing processes, for said water softener consists basically of a mixture of ammonium salt from a polycarbonic acid, a water-soluble alcohol and a tenside—and besides them, if desired, 0.5 to 2.0% by wt. of a phosphonic acid to strengthen the complexing effect, at which alkane-1,1-diphosphonic acids are used as phosphonic acids which at least in position 1 have hydroxy or amino groups.

This water softener serves only for the hardness stabilization of the washing water; regulation of the pH value is neither intended nor possible.

WAYS TO PERFORM THE INVENTION

To reduce the water hardness and to adjust the pH value, the phosphonic acid compounds investigated during the development of the present invention were used either as partially neutralized sodium salt itself or as a mixture of a phosphonic acid and its sodium salt or as a mixture of a phosphonic acid and the sodium salt of a different phosphonic acid.

The following examples serve as explanation; the substances used for the examples are given below with their abbreviations in brackets:

aminotris(methylenephosphonic acid) (ATMP);

disodium salt of morpholinomethanephosphonic acid ($MMDPNa_2$);

ethylenediaminetetra(methylenephosphonic acid) (EDTMP) and its pentasodium salt (EDTMPNa$_5$);

diethylenetriaminepenta(methylenephosphonic acid) (DETPMPNa$_7$) and its heptasodium salt.

EXAMPLE 1

First tests were carried out with aminotris (methylenephosphonic acid) (ATMP), the phosphonic acid mostly used for technical fields.

The experiments were not completely satisfying as at high carbonate hardness clouding and flocculation occurred, which in their appearance were similar to those caused by sodiumtripolyphosphate.

The bonding capacity of the hardness complexers was also not satisfying on the given conditions (test water: pH 7.8, hardness 5.4 mmol/l), as 2.1 ml of the 50% solution (which represents a reasonable application concentration) were consumed to reduce the hardness of 200 ml of the test water at 20° C. below the detection limit of 0.18 mmol (1° d). Contrary to that, on appropriate test conditions only 1.5 ml of the said conventional phosphate solution was needed. The percentage figures given in the examples always represent percent by weight.

EXAMPLE 2

Further tests were carried out with a 50% aqueous solution of disodium salt of morpholinomethanediphosphonic acid (MMDPNA2) because it has hydrophilic groups in its molecular structure which do not permit complexing, and therefore ensure good solubility of the Ca ions.

The tests initially appeared promising as, under the same conditions as in example 1 (200 ml test water with pH 7.8 and 5.4 mmol/l hardness; 50% MMDPANa$_2$-solution) the water hardness dropped below the detection limit already after the introduction of just 1.1 ml of the treatment solution. The softening effect was therefore apparent.

However, after a few days heavy bacterial clouding of the water with high level oxygen consumption regularly occurred, like the one to be observed in the example involving EDTA and NTA as described above. This surprising phenomenon could be explained by the fact that the used industrial MMDPA-Na$_2$ product contained acetate impurities coming from the manufacturing process.

Whereas acetate-polluted MMDPANa$_2$ solutions cannot be recommended for use in aquaria the non-polluted solutions fulfil the necessary requirements very satisfactorily.

EXAMPLE 3

Due to the structural similarity with EDTA which is known to complex strongly and also due to the presence of non-complexing hydrophilic groups in the molecule, tests were carried out with ethylenediaminetetra (methylenephosphonic acid) (EDTMP) and with diethylenetriaminepenta(methylenephosphonic acid) (DETPMP) and their salts.

With regard to their hardness-reducing properties both phosphonic acids proved to be effective in the test water (pH 7.8, hardness 5.4 mmol/l) of examples 1 and 2. 1.2 to 1.3 ml of the 50% aqueous solution of EDTMP/DETPMP or a 55% solution of DETPMPNa$_7$ was required per 200 ml of test water to lower the water hardness below the detection limit of 0.18 mmol/l. Even when used in water with a hardness of 10.4 mmol/l (58° d) the water remained permanently clear.

Said phosphonic acids and their salts are mixable at any ratio to each other in water without impairment to their effectiveness or stability, as it has shown by several tests carried out on the conditions described above.

EXAMPLE 4

The following commercially available and for aquaristic purposes economically acceptable substances were used: (mol wt refers to molecular weight)

EDTMPNa$_5$ (mol wt 546) as 56% water solution (solution A'); pH value of the 1% solution: 6–8 at 25° C.;

DETPMP (mol wt 573) as 50% water solution (solution B); pH value of the 1% solution: 2.2 at 25° C.;

DETPMPNa$_7$ (mol wt 727) as 57% water solution (solution B'); pH value of the 1% solution: 6–8 at 25° C.;

Each change of the pH value in the test water caused by the three solutions (A', B, B') remained very stable in contrast to conventional acidification with mineral acids.

Since, however, the solutions A' and B' yielded pH values between 7 and 8 whereas for very many aquarium fish the most favourable pH value is between 6 and 7, the pH value was corrected using solution B.

In tests with either very soft test water (<0.5 mmol/l; <2.8° d) or very hard water (<4.0 mmol/l; <25° d) it proved best to adjust the pH value of the mixtures of A' and B, (A'+B), and of B' and B, (B+B') to values between 5.5 and 5.7. This ensures that in very soft water which has a very low acid binding capacity due to the insufficient concentration of calcium carbonate the pH value does not drop to a value being harmful to fish; it also ensures sufficient acidification at very high initial values of acid binding capacity (high calcium carbonate concentration, often being the case in very hard water).

With both combinations, A'+B and B'+B good water softening and pH lowering and stabilising effects were attained without clouding or precipitation or an increase of the orthophosphate concentrations.

However, the application of combination B+B' led to a slight brown discoloration of the aquarium water caused by the dark brown colour of the DETPMP or DETPMPNa$_7$.

For this reason subsequent tests were only performed with the combination A'+B.

In these, mixtures, which were pale amber in colour, of 100 parts of solution A' and 20 parts of solution B were produced with a pH value between 5.5 and 5.6 and used in very hard test water with a hardness of 5.4 mmol/l (25° d) and a pH value of 7.8.

Using 1.3 ml of this mixture in 200 ml of test water the water hardness dropped below 0.18 mmol/l (1° d).

Since in aquaria only a reduction but not an approximately complete elimination of hardness is desired, the following dosage of mixture A'+B (100:20) was determined as the best for the treatment of water:

100 ml treatment solution/100 l water of hardness 2.7 mmol/l (15° d), 200 ml treatment solution/100 l water of hardness 5.5 mmol/l (30° d).

For the practical application the following basic test was carried out:

In a 170 l capacity aquarium containing fish, the water was exchanged after three days and had a pH value of 7.2 and a hardness value of 2.2 mmol/l (12° d). Then 170 ml of the A'+B (100:20) treatment solution defined above were added, resulting in lowering the pH value to 6.2 and the hardness to 0.6 mmol/l (3.4° d). Within the following three days the pH value rose to 6.4 and remained constant at this level until the next partial water exchange on the 17th day. The hardness had also not changed and the water was clear.

A total of 21 aquaria containing fish and plants were treated according to the stated dosage instructions, with an additional dosage administered on account of the new water after the partial water change. In all cases the targeted reductions of pH value and water hardness could be maintained without any of clouding and/or an increase of orthophosphate concentration in the aquarium water. The aquaria treated as described in the examples contained fish of all relevant aquaristic fish families such as characine, barbels, silurids, cichlids and others. Neither during nor after the current water treatment, and even not with repeated water treatments after the regular partial water exchanges there was no loss of fish. On the contrary, the fish were in very good condition with bright coloration, even after long-terms of many months of being exposed to water treated with the phosphonic acid according to the invention.

Even in tests with an A'+B treatment solution which was added in a threefold dosage—referring to the required one—no negative effects were to be noted with respect to the health or the behaviour of the fish during the observation for several weeks.

The high effectiveness and the good hydrolytic stability of the phosphonic acid compounds EDTMP and DETPMP used in the mixture A'+B were not impaired in water which had been heated to 60° C. or frozen over three days. Even the charcoal, a filter material frequently used in aquaristics, was not capable of reducing the effectiveness of the phosphonic acid compounds by absorption.

As a result of the stable pH value there was no incidence of the feared drop in acidity in very soft water after using the A'+B mixture; and in highly acidic aquarium water, which can arise in practical conditions after long periods without a water exchange and with abundant feeding, often leading to a valuable loss of fish, the A'+B mixture raised the pH value for a long period of time to the desired level being harmless for fish.

In general, from the wide range of tests undertaken to check the effectiveness of complexing phosphonic acids for regulating the pH value and lowering the water hardness levels of freshwater aquaria ( also based on phosphonic acids other than those discussed in detail in the examples) it can be concluded that complexing phosphonic acids are basically suitable to the purpose of fish water treatment. In individual cases the particular phosphonic acid did not satisfactorily meet the requirements, as it has shown in example 1 featuring aminotris(methylenephosphonic acid) (ATMP). The reasons for the failure of ATMP (clouding of the aquarium water) have not been clarified. This does not, however, detract from the basic assertion that complexing phosphonic acid is well suited for use in conditioning aquarium water.

Still it should be noted that the step taken in the tests reported in example 4 to produce an effective solution by mixing a solution of the free phosphonic acid and a solution of the sodium salt of the same or a different complexing phosphonic acid can be supported by partially neutralising a solution of the free acid with NaOH.

Although for the purposes of the invention it is basically sufficient to use the salt-acid mixture of a single type of complexing phosphonic acid, it is possible to produce a mixture of agents by combining at least two types of complexing phosphonic acids and their salts, thus combining highly effectively the different characteristics of each component with the aim of reaching the stated target of long-term water conditioning. Such a mixture of phosphonic acids could also enable the use of a type of phosphonic acid which, as an isolated substance, tends to produce flocculation but when combined with other phosphonic acids does not trigger flocculation on account of the low concentration.

The invention, being only described for sodium salts of phosphonic acids also relates to potassium salts of phosphonic acids.

I claim:

1. A process for regulating hardness and pH value of water in fresh water aquaria by adding to the water a composition comprising at least one derivative of oxo acids of phosphor capable of complexing with alkaline earth metal ions which cause the water hardness, wherein the oxo acid of the phosphor is phosphonic acid in the form of a partially neutralized sodium salt, or of a mixture of a phosphonic acid and its sodium salt, or of a mixture of phosphonic acid and the sodium salt of a different phosphonic acid.

2. A process according to claim 1, comprising the use of a methanediphosphonic acid, substituted at the carbon atom of the P—C bond as complexing phosphonic acid.

3. A process according to claim 2, comprising the use of 1-hydroxy-ethane-1,1-diphosphonic acid or morpholinomethanediphosphonic acid as complexing phosphonic acid.

4. A process according to claim 1, comprising the use of a methylphosphonic acid, substituted at the carbon atom of the P—C bond as complexing phosphonic acid.

5. A process according to claim 4, comprising the use of a derivative of an ethylenediamine compound as complexing phosphonic acid.

6. A process according to claim 5, comprising the use of ethylenediaminetetra (methylenephosphonic acid) (EDTMP) or diethylenetriaminepenta (methylenephosphonic acid (DETPMP) as complexing phosphonic acid.

7. A process according to claim 6, comprising comprising the use of the mixture of a solution of a heptasodium salt of DETPMP (DETPMPNa$_7$) and of a solution of DETPMP as complexing phosphonic acid.

8. A process according to claim 6, comprising comprising the use of a mixture of a solution of a pentasodium-salt of EDTMP (EDTMPNa$_5$) and of a solution of DETPMP as complexing phosphonic acid.

9. A process according to claim 8, comprising the use of a mixture of 100 parts of solution containing about 55% by weight EDTMPNa$_5$ and 20 parts of a solution containing about 50% by weight DETPMP as a ready to use solution containing a complexing phosphonic acid.

10. A process according to claim 1, comprising the use of a mixture of free phosphonic acid and a sodium or potassium salt of this acid.

11. A process according to claim 1, comprising the use of a mixture of a complexing free phosphonic acid and a sodium or potassium salt of at least another complexing phosphonic acid.

12. A process according to claim 11, comprising the use of phosphonic acids or their salts as aqueous solutions as complexing phosphonic acid.

* * * * *